(12) United States Patent
Yu et al.

(10) Patent No.: US 11,611,988 B2
(45) Date of Patent: Mar. 21, 2023

(54) RANDOM ACCESS METHOD AND APPARATUS

(71) Applicant: HUAWEI TECHNOLOGIES CO., LTD., Guangdong (CN)

(72) Inventors: Yinghui Yu, Beijing (CN); Odile Rollinger, Cambridge (GB); Baokun Shan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 11 days.

(21) Appl. No.: 16/992,649

(22) Filed: Aug. 13, 2020

(65) Prior Publication Data

US 2020/0374927 A1 Nov. 26, 2020

Related U.S. Application Data

(63) Continuation of application No. PCT/CN2018/076897, filed on Feb. 14, 2018.

(51) Int. Cl.
*H04W 74/00* (2009.01)
*H04W 74/08* (2009.01)

(52) U.S. Cl.
CPC ....... *H04W 74/008* (2013.01); *H04W 74/006* (2013.01); *H04W 74/0833* (2013.01)

(58) Field of Classification Search
CPC ............. H04W 74/004; H04W 74/006; H04W 74/008; H04W 74/0833
See application file for complete search history.

(56) References Cited

U.S. PATENT DOCUMENTS 11,026,123 B2 * 6/2021 Lee .................. H04W 60/04
2014/0293947 A1 10/2014 Nishikawa et al.
(Continued)

FOREIGN PATENT DOCUMENTS

CN 107548159 A 1/2018
EP 3651503 A1 5/2020
(Continued)

OTHER PUBLICATIONS

Huawei et al.,"Early data transmission in RACH for NB-IoT",3GPP TSG RAN WG1 Meeting #90bis R1-1717724, Prague, Czech Republic, Oct. 9-13, 2017,total 4 pages.
(Continued)

*Primary Examiner* — Liton Miah
(74) *Attorney, Agent, or Firm* — Womble Bond Dickinson (US) LLP (57) ABSTRACT

This application provides a random access method and apparatus. The method may include determining, by a terminal, a service attribute of to-be-transmitted data, where the service attribute includes one or more of the following: a service type attribute, a service packet attribute, and a service latency attribute. The method may also include sending, by the terminal when the service attribute meets a preset condition for early data transmission, a random access request to a network device using a dedicated resource for the early data transmission. In this way, the early data transmission is initiated after the service attribute meets the preset condition for the early data transmission, so that a quantity of times for which the early data transmission is initiated is reduced, thereby saving resources. In addition, a success rate of the early data transmission can be improved.

20 Claims, 4 Drawing Sheets

(56) References Cited

U.S. PATENT DOCUMENTS

| | | | |
|---|---|---|---|
| 2019/0037447 A1* | 1/2019 | Lee | H04W 28/18 |
| 2019/0335363 A1* | 10/2019 | Lee | H04W 60/04 |
| 2020/0187245 A1* | 6/2020 | Fujishiro | H04W 4/70 |
| 2020/0236598 A1* | 7/2020 | Kim | H04W 36/0079 |
| 2020/0245242 A1* | 7/2020 | Höglund | H04W 52/0216 |

FOREIGN PATENT DOCUMENTS

| | | | |
|---|---|---|---|
| EP | 3664554 A1 | 6/2020 | |
| WO | 2019022530 A1 | 1/2019 | |
| WO | WO-2019098118 A1 * | 5/2019 | H04W 8/24 |

OTHER PUBLICATIONS

3GPP TS 36.331 V15.0.1 (Jan. 2018);3rd Generation Partnership Project;Technical Specification Group Radio Access Network;Evolved Universal Terrestrial Radio Access (E-UTRA);Radio Resource Control (RRC);Protocol specification Release 15);total 776 pages.

LG Electronics, Data transmission during random access procedure in NB-IoT 3GPP TSG RAN WG1 Meeting 91, Reno, USA, Nov. 27-Dec. 1, 2017, R1-1719880, 6 pages.

Huawei et al.,"Early data transmission on dedicated resource for Rel-15 MTC",3GPP TSG RAN WG2 #99 Meeting R2-1709334,Berlin, Germany, Aug. 21-25, 2017,total 2 pages.

Huawei, HiSilicon, Neul, Trigger for EDT. 3GPP TSG-RAN WG2 Meeting #100, Reno, USA, Nov. 27-Dec. 1, 2017, R2-1713189, 3 pages.

Huawei et al.,"Introduction of further NB-IoT enhancements in TS 36.331",3GPP TSG-RAN2 Meeting #100 R2-1714272,Reno. US, Nov. 27-Dec. 1, 2017,total 44 pages.

Huawei, HiSilicon, Neul, General discussion on early data transmission. 3GPP TSG RAN WG2 #99bis Meeting, Prague, Czech Republic, Oct. 9-13, 2017, R2-1711324, 5 pages.

Nokia, Nokia Shanghai Bell, Data transmission during random access procedure. 3GPP TSG RAN WG1 Meeting #90, Prague, Czech Republic, Aug. 21-25, 2017, R1-1713726, 3 pages.

MediaTek Inc.,"On NB-IoT EDT indication via PRACH", 3GPP TSG RAN WG1 Meeting #91, R1-1719592, Reno, Nevado, USA, Nov. 27-Dec. 1, 2017, total 5 pages.

* cited by examiner

RANDOM ACCESS METHOD AND APPARATUS

CROSS-REFERENCE TO RELATED APPLICATIONS

This application is a continuation of International Application No. PCT/CN2018/076897, filed on Feb. 14, 2018, the disclosure of which is hereby incorporated by reference in its entirety.

TECHNICAL FIELD

This application relates to the wireless communications field, and in particular, to a random access method and apparatus.

BACKGROUND

Mobile communication has greatly changed people's life, but the pursuit of mobile communication having higher performance has never stopped. A 5th generation (5G) system emerges to cope with explosive growth of mobile data traffic, massive device connections, and continuous emergence of various new services and application scenarios in the future. Market demand for an internet of things (IoT), which is a part of 5G, is growing rapidly. Currently, a solution is proposed for a characteristic of the internet of things based on a cellular network. For example, both a narrowband internet of things (NB-IoT) network and a machine-type communication (MTC) network bear IoT services by using narrowband technologies.

In the third generation partnership project (3GPP) release 15 (Rel-15), a transmission characteristic of a small packet of the internet of things is optimized in the NB-IoT network and the MTC network, and an early data transmission (EDT) technology for data transmission performed in a random access process is proposed. Specifically, in a current EDT design, a system reserves, for EDT, some dedicated access resources such as a physical random access channel (PRACH) resource. A terminal that needs to initiate an EDT service may notify, by using the resource reserved for the EDT, a base station that transmission initiated this time is the EDT transmission. A large quantity of terminals transmit data by using the dedicated access resources for the EDT. Consequently, EDT resource congestion is caused, and a success rate of the EDT is reduced.

In addition, because the base station cannot obtain a size of signaling or a packet to be transmitted by the user, the base station can only perform blind scheduling. To ensure a success rate of the early data transmission, the base station schedules resources as many as possible during the blind scheduling. The EDT technology occupies a relatively large quantity of resources to reduce a latency and power consumption.

SUMMARY

This application provides a random access method and apparatus to resolve a problem of excessively high resource consumption caused by EDT.

According to a first aspect, this application provides a random access method, including:

determining, by a terminal, a service attribute of to-be-transmitted data, where the service attribute includes one or more of the following: a service type attribute, a service packet attribute, and a service latency attribute; and sending, by the terminal if the service attribute meets a preset condition for early data transmission, a random access request to a network device by using a dedicated resource for the early data transmission.

In a possible embodiment, the service attribute includes the service type attribute, and the determining, by a terminal, a service attribute of to-be-transmitted data includes:

determining, by the terminal, the service type attribute of the to-be-transmitted data based on a type identifier of the to-be-transmitted data.

In a possible embodiment, the determining, by the terminal, the service type attribute of the to-be-transmitted data based on a type identifier of the to-be-transmitted data includes:

determining, by the terminal based on the type identifier of the to-be-transmitted data, whether the to-be-transmitted data is user data; and correspondingly, the sending, by the terminal if the service attribute meets a preset condition for early data transmission, a random access request to a network device by using a dedicated resource for the early data transmission includes:

sending, by the terminal if the to-be-transmitted data is the user data, the random access request to the network device by using the dedicated resource for the early data transmission.

In a possible embodiment, the service attribute includes the service packet attribute, and the determining, by a terminal, a service attribute of to-be-transmitted data includes:

determining, by the terminal, the service type attribute of the to-be-transmitted data based on a packet type of the to-be-transmitted data.

In a possible embodiment, the determining, by the terminal, the service type attribute of the to-be-transmitted data based on a packet type of the to-be-transmitted data includes:

determining, by the terminal based on the packet type of the to-be-transmitted data, whether the to-be-transmitted data is transmitted through single-packet transmission or dual-packet transmission; and correspondingly, the sending, by the terminal if the service attribute meets a preset condition for early data transmission, a random access request to a network device by using a dedicated resource for the early data transmission includes:

sending, by the terminal if the to-be-transmitted data is transmitted through the single-packet transmission or the dual-packet transmission, the random access request to the network device by using the dedicated resource for the early data transmission.

In a possible embodiment, the service attribute includes the service latency attribute, and the determining, by a terminal, a service attribute of to-be-transmitted data includes:

determining, by the terminal, the service type attribute of the to-be-transmitted data based on a service latency identifier of the to-be-transmitted data.

In a possible embodiment, the determining, by the terminal, the service type attribute of the to-be-transmitted data based on a service latency identifier of the to-be-transmitted data includes:

determining, by the terminal based on the service latency identifier of the to-be-transmitted data, whether the to-be-transmitted data is latency-sensitive service data; and correspondingly, the sending, by the terminal if the service attribute meets a preset condition for early data transmission, a random access request to a network device by using a dedicated resource for the early data transmission includes:

sending, by the terminal if the to-be-transmitted data is the latency-sensitive service data, the random access request to the network device by using the dedicated resource for the early data transmission.

In a possible embodiment, the service attribute includes the service packet attribute; and the sending, by the terminal if the service attribute meets a preset condition for early data transmission, a random access request to a network device by using a dedicated resource for the early data transmission includes:

sending, by the terminal if the to-be-transmitted data is a single packet for downlink transmission, the random access request to the network device by using a dedicated resource for downlink early data transmission.

In a possible embodiment, the service attribute includes the service latency attribute; and the sending, by the terminal if the service attribute meets a preset condition for early data transmission, a random access request to a network device by using a dedicated resource for the early data transmission includes:

sending, by the terminal if the to-be-transmitted data is latency-sensitive service data for downlink transmission, the random access request to the network device by using a dedicated resource for downlink early data transmission.

In a possible embodiment, the dedicated resource for the downlink early data transmission is a part of the dedicated resources for the early data transmission.

In a possible embodiment, after the sending, by the terminal, a random access request to a network device by using a dedicated resource for the early data transmission, the method further includes:

receiving, by the terminal, a random access response sent by the network device, where the random access response indicates an uplink transmission resource;

sending, by the terminal, a downlink data transmission request to the network device by using the uplink transmission resource; and receiving, by the terminal, the to-be-transmitted data sent by the network device.

In a possible embodiment, the method further includes:

receiving, by the terminal, indication information that is of the dedicated resource for the early data transmission and that is sent by the network device, where the indication information of the dedicated resource for the early data transmission is one of a broadcast message, dedicated signaling, and a paging message.

According to a second aspect, this application provides a random access method, including:

receiving, by a network device, a random access request that is sent, after a terminal determines that a service attribute of to-be-transmitted data meets a preset condition for early data transmission, by the terminal by using a dedicated resource for the early data transmission, where the service attribute includes one or more of the following: a service type attribute, a service packet attribute, and a service latency attribute; and sending, by the network device, a random access response to the terminal, where the random access response is used to allocate an uplink transmission resource to the terminal.

In a possible embodiment, the method further includes:

obtaining, by the network device, the service attribute of the to-be-transmitted service data.

In a possible embodiment, the obtaining, by the network device, the service attribute of the to-be-transmitted service data includes:

receiving, by the network device, indication information that is of the service attribute and that is sent by an MME; or receiving, by the device, indication information that is of the service attribute and that is sent by the terminal, where the indication information of the service attribute is used to indicate the service attribute of the to-be-transmitted service data.

In a possible embodiment, after the sending, by the network device, a random access response to the terminal, where the random access response is used to allocate an uplink transmission resource to the terminal, the method further includes:

receiving, by the network device, the to-be-transmitted data sent by the terminal by using the uplink resource.

In a possible embodiment, after the sending, by the network device, a random access response to the terminal, where the random access response is used to allocate an uplink transmission resource to the terminal, the method further includes:

receiving, by the network device, a downlink data transmission request sent by the terminal by using the uplink resource; and sending, by the network device, the to-be-transmitted data to the terminal.

In a possible embodiment, the receiving, by a network device, a random access request that is sent, after a terminal determines that a service attribute of to-be-transmitted data meets a preset condition for early data transmission, by the terminal by using a dedicated resource for the early data transmission includes:

receiving, by the network device, the random access request that is sent, after the terminal determines that the service attribute of the to-be-transmitted data meets the preset condition for the early data transmission, by the terminal by using a dedicated resource for downlink early data transmission, where the dedicated resource for the downlink early data transmission is a part of the dedicated resources for the early data transmission.

According to a third aspect, this application provides a random access apparatus. The apparatus includes a module or a means for performing the methods provided in the first aspect or the second aspect and the implementations of the first aspect or the second aspect.

According to a fourth aspect, this application provides a random access apparatus. The apparatus includes a processor and a memory. The memory is configured to store a program. The processor invokes the program stored in the memory, to perform the method provided in any implementation of the first aspect of this application. The apparatus may be a terminal, or may be a chip on a terminal.

According to a fifth aspect, this application provides a random access apparatus. The apparatus includes a processor and a memory. The memory is configured to store a program. The processor invokes the program stored in the memory, to perform the method provided in any implementation of the second aspect of this application. The apparatus may be a network device, or may be a chip on a network device.

According to a sixth aspect, this application provides a computer storage medium. The computer storage medium is configured to store a program, and the program is used to perform any method according to the first aspect or the second aspect.

In the random access method according to this application, and for the random access apparatus according to this application, the terminal determines the service attribute of the to-be-transmitted data. If the service attribute meets the preset condition for the early data transmission, the terminal sends the random access request to the network device by using the dedicated resource for the early data transmission. In this way, the early data transmission is initiated after the service attribute meets the preset condition for the early data transmission, so that a quantity of times for which the early data transmission is initiated is reduced, thereby saving resources. In addition, a success rate of the early data transmission can be improved.

DESCRIPTION OF EMBODIMENTS

Embodiments of this application may be applied to a wireless communications system. It should be noted that the wireless communications system mentioned in the embodiments of this application includes but is not limited to a narrowband internet of things NB-IoT system, a global system for mobile communications (GSM) system, an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and three major application scenarios of a next generation 5G mobile communications system, namely, enhanced mobile broadband (eMBB), ultra-reliable low-latency communication (URLLC), and massive machine-type communications (mMTC).

Figure 1:
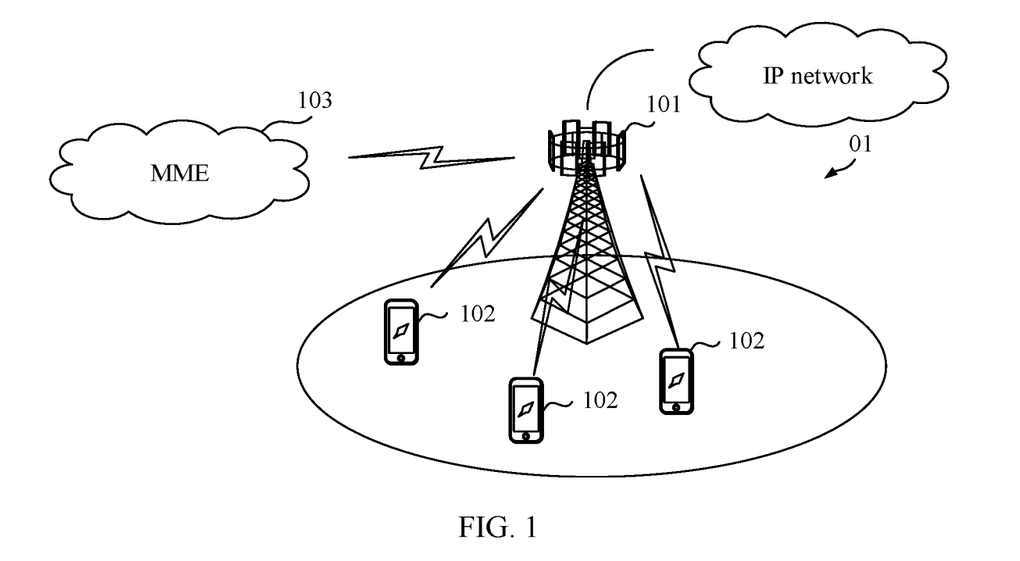
FIG. 1 is a schematic structural diagram of a communications system according to this application.

FIG. 1 is a schematic structural diagram of a communications system according to this application.

As shown in FIG. 1, a communications system 01 includes a network device 101, a terminal 102, and a mobility management entity (MME) 03. When the wireless communications network 01 includes a core network, the network device 101 may be further connected to the core network. The network device 101 may further communicate with an internet protocol (IP) network 200, for example, the internet, a private IP network, or another data network.

A network device provides a service for a terminal within a coverage area of the network device. For example, referring to FIG. 1, the network device 101 provides wireless access for one or more terminals within a coverage area of the network device 101. In addition, network devices may further communicate with each other.

A non-access stratum (NAS) of an MME and a NAS of a terminal may be equivalent, and are used to perform information transmission. In addition, the MME and the network device may communicate with each other.

In the embodiments of this application, the terminal (e.g., a terminal device) 102 includes but is not limited to a mobile station (MS), a mobile terminal, a mobile telephone, a handset, portable equipment, and the like. The terminal may communicate with one or more core networks by using a radio access network (RAN). For example, the terminal may be a mobile telephone (or referred to as a "cellular" telephone) or a computer having a wireless communication function; or the terminal 102 may be a portable, pocket-sized, handheld, computer built-in, or vehicle-mounted mobile apparatus or device.

The network device 101 may be a device configured to communicate with the terminal 102. For example, the network device 101 may be a base transceiver station (BTS) in a GSM system or CDMA system, a NodeB (NB) in a WCDMA system, an evolved NodeB (eNB or eNodeB) in an LTE system, or a network side device in a future 5G network. Alternatively, the network device may be a relay station, an access point, a vehicle-mounted device, or the like. Alternatively, in a terminal-to-terminal (e.g., Device-to-Device, or D2D) communications system, the network device may be a terminal that functions as a base station.

This application provides a random access method, to determine terminals used or cases in which EDT access is initiated, thereby better saving resources.

Figure 2:
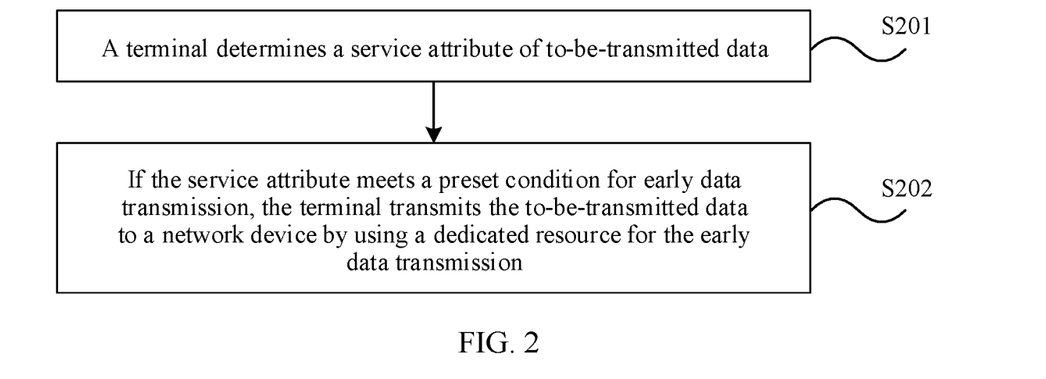
FIG. 2 is a schematic flowchart of a random access method according to an embodiment of this application.

FIG. 2 is a schematic flowchart of a random access method according to an embodiment of this application. As shown in FIG. 2, the method includes the following steps.

S201: A terminal determines a service attribute of to-be-transmitted data.

The service attribute may include one or more of the following: a service type attribute, a service packet attribute, and a service latency attribute.

The service type attribute may be used to distinguish between different types of services, for example, user data and non-user data. Specifically, the non-user data may be request information used to request resources for uplink signaling (request resources for UL signaling), an uplink short message service message (MO SMS), uplink signaling, or the like.

The service packet attribute may be used to distinguish between different types of packet transmission, for example, (1) single-packet transmission, (2) dual-packet transmission, and multi-packet transmission. The single-packet transmission may specifically be uplink single-packet transmission or downlink single-packet transmission. The dual-packet transmission may specifically indicate that the terminal sends an uplink packet to a network device, and then the network device sends a corresponding downlink packet to the terminal; or indicate that a network device sends a downlink packet to the terminal, and then the terminal sends a corresponding uplink packet to the network device. The multi-packet transmission may specifically include uplink packet transmission performed once and a plurality of times of corresponding downlink packet transmission, include downlink packet transmission performed once and a plurality of times of corresponding uplink packet transmission, include a plurality of times of uplink packet transmission and a plurality of times of corresponding downlink packet transmission, or include the like. This is not limited in this application.

The service latency attribute may be used to distinguish between different types of data transmission having different latency requirements. The different types of data transmission may include latency-insensitive data transmission and latency-sensitive service data transmission. For an internet of things application, for example, services such as an alarm service, a smart street lamp, and a shared bike, the latency-sensitive service data transmission is applied. To meet an end-to-end latency requirement, a latency needs to be less than preset duration of several seconds, for example, less than 5 seconds. For another example, the latency-insensitive data transmission is applicable to services such as sensor data reporting, electricity meter reporting, and water meter reporting.

S202: If the service attribute meets a preset condition for early data transmission, the terminal sends a random access request message to the network device by using a dedicated resource for the early data transmission.

Optionally, the random access request may be carried in a message 1 (MSG 1).

Correspondingly, if downlink early data transmission is performed, to be specific, the network device sends data to the terminal, the network device allocates, by using a random access response message, an uplink transmission resource after receiving the random access request. For example, a physical uplink shared channel (PUSCH) resource used for user signaling is allocated, and the terminal may send a downlink data transmission request or the like by using the allocated PUSCH resource. Alternatively, if uplink early data transmission is performed, to be specific, the terminal sends data to the network device, the network device allocates, by using a random access response message after receiving the random access request, a PUSCH resource used for uplink data transmission, and the terminal may send the data to the network device by using the allocated PUSCH resource.

The random access response message may be carried in a message 2 (MSG 2).

The dedicated resource for the early data transmission may be configured by the network device for the terminal, or may be specified in a standard. To be specific, the network device may indicate some physical random access channel (PRACH) resources to be dedicated resources for the early data transmission.

Optionally, before S202 is performed, the terminal may obtain the dedicated resource that is used for the early data transmission and that is indicated by the network device. The dedicated resource for the early data transmission is indicated by using one of a broadcast message, dedicated signaling, and a paging message. This is not limited in this embodiment.

In a specific implementation, the dedicated resource for the early data transmission may be indicated by using scheduling information of the paging message, or may be indicated by using RRC information of the paging message. This is not limited herein.

Specifically, the terminal initiates the early data transmission only after determining that the service attribute meets the preset condition for the early data transmission.

Optionally, dedicated resources for the early data transmission may be further classified into dedicated resources for downlink early data transmission and dedicated resources for uplink early data transmission. A dedicated resource for the downlink early data transmission may be a part of the dedicated resources for the early data transmission, and is indicated to be a dedicated PRACH resource for MT EDT.

Alternatively, the dedicated resource for the downlink early data transmission may be a PRACH resource that is allocated by using an MSG 3 and that carries less than or equal to N bits. To be specific, when the terminal performs access by using the PRACH resource, the network side allocates, to the terminal, a PUSCH resource that is allocated by using the MSG 2 and that carries less than N bits. The PUSCH resource is used to transmit a downlink data transmission request (MSG 3) that is used to initiate the downlink early data transmission. N is greater than 0, and N is less than or equal to a minimum quantity of bits required for uplink user data transmission. For example, N is 320, 400, or the like. This is not limited in this application.

In this embodiment, the terminal determines the service attribute of the to-be-transmitted data. If the service attribute meets the preset condition for the early data transmission, the terminal sends the random access request to the network device by using the dedicated resource for the early data transmission. In this way, the early data transmission is initiated after the service attribute meets the preset condition for the early data transmission, so that a quantity of times for which the early data transmission is initiated is reduced, thereby saving resources. In addition, a success rate of the early data transmission can be improved.

The to-be-transmitted data may be to-be-transmitted uplink data or to-be-transmitted downlink data. The following describes a case in which the to-be-transmitted data is the to-be-transmitted uplink data.

In an embodiment, the service attribute includes the service type attribute. Correspondingly, the terminal may determine the service type attribute of the to-be-transmitted data based on a type identifier of the to-be-transmitted data.

To be specific, the type identifier is provided in this embodiment. The type identifier of the data may be preconfigured for the terminal, or may be specified in a standard. This is not limited herein.

Specifically, a NAS of the terminal may be used to distinguish between service attributes of the to-be-transmitted data. Specifically, the service attributes corresponding to various type identifiers may be preconfigured.

For example, a value of one bit is used to distinguish between the user data and the non-user data. "1" is used to identify the user data, and "0" is used to identify the non-user data. Alternatively, "1" is used to identify the non-user data, and "0" is used to identify the user data. Alternatively, a Boolean parameter is used, where "true" indicates the user data, and "false" indicates the non-user data, or vice versa.

Alternatively, two bits are used to distinguish between the user data, the request information used to request the resources for the uplink signaling, and an uplink short message service message, for example, 00: the user data, 01: the request information used to request the resources for the uplink signaling, 10: the MO SMS, and 11: a reserved bit;

00: the user data, 01: the MO SMS, 10: the request information used to request the resources for the uplink signaling, and 11: a reserved bit;

00: the request information used to request the resources for the uplink signaling, 01: the user data, 10: the MO SMS, and 11: a reserved bit;

00: the request information used to request the resources for the uplink signaling, 01: the MO SMS, 10: the user data, and 11: a reserved bit;

00: the MO SMS, 01: the request information used to request the resources for the uplink signaling, 10: the user data, and 11: a reserved bit; or 00: the MO SMS, 01: the user data, 10: the request information used to request the resources for the uplink signaling, and 11: a reserved bit.

The NAS of the terminal notifies an access stratum (AS) of the terminal of the type identifier of the to-be-transmitted data. Before the to-be-transmitted data is transmitted, the AS performs check to determine whether the service attribute of the to-be-transmitted data meets the preset condition for the early data transmission, that is, determine whether to initiate the early data transmission.

Specifically, the terminal determines, based on the type identifier of the to-be-transmitted data, whether the to-be-transmitted data is the user data.

If the to-be-transmitted data is the user data, the terminal sends the random access request to the network device by using the dedicated resource for the early data transmission or the dedicated resource for the uplink early data transmission. The network device allocates, by using the random access response message, the uplink transmission resource after receiving the random access request. The terminal sends, on the allocated uplink transmission resource, the to-be-transmitted data to the network device.

In other words, if the to-be-transmitted data is the user data, the terminal selects the dedicated resource for the early data transmission to send the random access request message (MSG 1), receives the PUSCH resource allocated by the network device by using the random access response message MSG 2, and sends, on the PUSCH resource allocated by the network device, the to-be-transmitted data. Otherwise, the terminal selects another normal PRACH resource to send the random access request. Similarly, the network device allocates, by using the random access response message, the uplink transmission resource after receiving the random access request. The terminal sends, on the allocated uplink transmission resource, the to-be-transmitted data to the network device.

For example, in a random access process, when the to-be-transmitted data is the user data, it is determined to initiate the EDT access. The terminal first sends, by using the dedicated resource for the early data transmission or the dedicated resource for the uplink early data transmission, the MSG 1 including the random access request, further receives the PUSCH resource allocated by the network device, and sends the to-be-transmitted data to the network device by using the PUSCH resource allocated by the network device. Specifically, the to-be-transmitted data may be carried in the message 3 (MSG 3). Signaling for transmitting the MSG 3 may be one of the following: a radio resource control (RRC) early data request, an RRC connection resume request, a connection less data request, a single data request (e.g., a One Shot Data Request), and the like.

If the to-be-transmitted data is the non-user data, the terminal requests to establish/resume an RRC connection by using an RRC connection request or an RRC connection resume request.

In a possible manner, the terminal further sends the type identifier of the to-be-transmitted data to the network device. For example, the terminal sends the MSG 3 including the type identifier.

Alternatively, in another possible manner, the MME sends the type identifier of the to-be-transmitted data to the network device. Specifically, the MME may send the type identifier of the to-be-transmitted data to the network device by using one of the following information: terminal information transfer (e.g., UE Information Transfer) signaling, a terminal context resume response (e.g., UE context resume response), a connection establishment indication, downlink NAS transport signaling, and the like.

The network device determines attribute information of the to-be-transmitted data based on the type identifier that is of the to-be-transmitted data and that is sent by the terminal or the MME.

If the network device determines that the attribute information of the to-be-transmitted data meets the preset condition for the early data transmission, for example, if the to-be-transmitted data is the user data, the network device replies to a response message after receiving the user data. The response message may be a message 4 (MSG 4).

Correspondingly, signaling for transmitting the MSG 4 may be one of the following: an RRC early data response, an RRC connection resume response, a connection less data response, and a single data response (e.g, a One Shot Data Response).

If the to-be-transmitted data is the non-user data, the network device establishes/resumes an RRC connection in response to an RRC connection request or an RRC connection resume request of the terminal.

In another embodiment, the service attribute includes the service packet attribute.

Optionally, in this embodiment, a transmission characteristic (e.g., a traffic profile) attribute may be added, to be specific, the service packet attribute of the to-be-transmitted data is indicated.

The service packet attribute may be written into the terminal as subscription information, or may be written into a home subscriber server (HSS) as subscription information. The subscription information may indicate a packet type.

That the terminal determines the service attribute of the to-be-transmitted data may be as follows: The terminal determines the service type attribute of the to-be-transmitted data based on the packet type of the to-be-transmitted data.

Optionally, the terminal determines, based on the packet type of the to-be-transmitted data, whether the to-be-transmitted data is transmitted through the single-packet transmission or the dual-packet transmission. For uplink data that is to be transmitted, if the to-be-transmitted data is transmitted through the single-packet transmission or the dual-packet transmission, the terminal sends the random access request to the network device by using the dedicated resource for the early data transmission or the dedicated resource for the uplink early data transmission, and the network device allocates, by using the random access response message, the uplink transmission resource after receiving the random access request. The terminal sends, on the allocated uplink transmission resource, the to-be-transmitted data to the network device.

Otherwise, the terminal selects another normal PRACH resource to send the random access request. Similarly, the network device allocates, by using the random access response message, the uplink transmission resource after receiving the random access request. The terminal sends, on the allocated uplink transmission resource, the to-be-transmitted data to the network device.

In a random access process, if the to-be-transmitted data is transmitted through the single-packet transmission or the dual-packet transmission, the terminal first sends, by using the dedicated resource for the early data transmission, the MSG 1 including the random access request, further receives the uplink transmission resource allocated by the network device, and sends the to-be-transmitted data to the network device by using the uplink transmission resource allocated by the network device. Specifically, the to-be-transmitted data may be carried in the MSG 3. Signaling for transmitting the MSG 3 may be one of the following: an RRC early data request, an RRC connection resume request, a connection less data request, a single data request, and the like.

If the to-be-transmitted data is transmitted through the multi-packet transmission, the terminal requests to establish/resume an RRC connection by using an RRC connection request or an RRC connection resume request.

In a possible manner, the MME may obtain the service packet attribute of the to-be-transmitted data based on the subscription information of the terminal. Further, the network device may receive an indication information that is of the service packet attribute and that is sent by the MME, to indicate the service packet attribute of the to-be-transmitted data.

Specifically, the MME may send the indication information of the service packet attribute to the network device by using one of the following information: terminal information transfer signaling, a terminal context resume response, a connection establishment indication, downlink NAS transport signaling, and the like.

Alternatively, the terminal sends the indication information of the service packet attribute to the network device. This is not limited in this application.

When the network device determines, based on the indication information of the service packet attribute, that the to-be-transmitted data meets the preset condition for the early data transmission, for example, when the to-be-transmitted data is transmitted through the single-packet transmission or the dual-packet transmission, the network device replies to a response message after receiving the to-be-transmitted data. The response message may be a MSG 4.

Correspondingly, signaling for transmitting the MSG 4 may be one of the following: an RRC early data response, an RRC connection resume response, a connection less data response, and a single data response.

When the to-be-transmitted data is transmitted through the single-packet transmission, optionally, after the terminal sends the to-be-transmitted data (namely, an uplink packet) to the network device, the MME sends an end indication to the network device, to indicate the network device to quickly release a connection.

More specifically, after the MME obtains the uplink packet sent by the terminal, the MME may determine, based on a release assistance indication (RAI), that no packet is subsequently transmitted or only one downlink packet is subsequently transmitted (that is, no uplink packet is transmitted). The MME sends the end indication to the network device, to indicate the network device to quickly release the connection.

Optionally, the MME may send the end indication to the network device by using one of the following information: terminal information transfer signaling, a terminal context resume response, a connection establishment indication, downlink NAS transport signaling, and the like.

If the to-be-transmitted data is transmitted through the multi-packet transmission, the network device establishes/resumes an RRC connection in response to an RRC connection request or an RRC connection resume request of the terminal.

In still another embodiment, the service attribute includes the service latency attribute.

That the terminal determines the service attribute of the to-be-transmitted data may be as follows: The terminal determines the service type attribute of the to-be-transmitted data based on a service latency identifier of the to-be-transmitted data.

That is, in this embodiment, the service latency identifier is added. Optionally, the service latency identifier may be implemented by using a quality of service class identifier (e.g., QoS Class Identifier, or QCI).

Specifically, the QCI may be defined by using Table 1 as an example.

TABLE 1

| QCI | Resource type | Priority | Packet latency budget | Packet error loss rate | Service example |
|---|---|---|---|---|---|
| XX | Non-GBR | 2 | Five seconds | $10^{-6}$ | IoT transmission |

Non-guaranteed bit rate (GBR) indicates that a network does not provide a minimum guaranteed transmission rate (e.g., a GBR).

A QCI value is a value ranging from 0 to 255. Except QCI values (for example, 1-9, 65-67, 69, 70, 75, 79, 80, 82, and 83) that have been currently occupied by enhanced mobile broadband (eMBB), vehicle to everything (V2X), and the like, one of remaining reserved values may be used as a service latency identifier of the internet of things, to distinguish between latency-sensitive service data and latency-insensitive service data.

The EDT is also used to reduce a latency to some extent. In this embodiment, initiating the EDT for the latency-sensitive service data is allowed.

Optionally, the terminal determines, based on the service latency identifier of the to-be-transmitted data, whether the to-be-transmitted data is the latency-sensitive service data. Specifically, the terminal may determine, based on QCI corresponding to the to-be-transmitted data, whether the to-be-transmitted data is the latency-sensitive service data.

If the to-be-transmitted data is the latency-sensitive service data, the terminal sends the random access request to the network device by using the dedicated resource for the early data transmission or the dedicated resource for the uplink early data transmission, and the network device allocates, by using the random access response message, the uplink transmission resource after receiving the random access request. The terminal sends, on the allocated uplink transmission resource, the to-be-transmitted data to the network device.

Otherwise, the terminal selects another normal PRACH resource to send the random access request. Similarly, the network device allocates, by using the random access response message, the uplink transmission resource after receiving the random access request. The terminal sends, on the allocated uplink transmission resource, the to-be-transmitted data to the network device.

For example, in a random access process, when the to-be-transmitted data is the latency-sensitive service data, it is determined to initiate the EDT access. Specifically, the terminal first sends, by using the dedicated resource for the early data transmission, the MSG 1 including the random access request, further receives the uplink transmission resource allocated by the network device, and sends the to-be-transmitted data to the network device by using the uplink transmission resource allocated by the network device. Specifically, the to-be-transmitted data may be carried in the MSG). Signaling for transmitting the MSG 3 may be one of the following: an RRC early data request, an RRC connection resume request, a connection less data request, a single data request, and the like.

If the to-be-transmitted data is the latency-insensitive service data, the terminal requests to establish/resume an RRC connection by using an RRC connection request or an RRC connection resume request.

In a possible manner, the MME may obtain the service latency identifier (for example, the QCI) of the to-be-transmitted data through the NAS of the terminal. If the MME determines, based on the service latency identifier of the to-be-transmitted data, that the to-be-transmitted data is the latency-insensitive service data, the MME sends the service latency identifier to the network device, so that the network device determines content of a response message.

Optionally, the MME may send the service latency identifier to the network device by using one of the following information: terminal information transfer signaling, a terminal context resume response, a connection establishment indication, downlink NAS transport signaling, and the like.

Alternatively, the terminal sends the service latency identifier to the network device. This is not limited in this application.

The network device determines, based on the service latency identifier, that the to-be-transmitted data is the latency-sensitive service data, that is, the to-be-transmitted data meets the preset condition for the early data transmission. In this way, the network device replies to the response message after receiving the to-be-transmitted data. The response message may be an MSG 4.

Correspondingly, signaling for transmitting the MSG 4 may be one of the following: an RRC early data response, an RRC connection resume response, a connection less data response, and a single data response.

If the to-be-transmitted data is the latency-insensitive service data, the network device establishes/resumes an RRC connection in response to an RRC connection request or an RRC connection resume request of the terminal.

Further, the initiated early data transmission service may alternatively be a downlink early data transmission service (DL EDT) service. That is, the to-be-transmitted data is downlink data. Similarly, the terminal first obtains the service attribute of the to-be-transmitted data.

Correspondingly, the terminal determines whether the service attribute of the to-be-transmitted data meets the preset condition for the early data transmission, indicating that the terminal determines whether the service attribute of the to-be-transmitted data meets a condition for the downlink early data transmission. If it is determined that the service attribute of the to-be-transmitted data meets the condition for the downlink early data transmission, the terminal sends the random access request to the network device by using the dedicated resource for the downlink early data transmission.

Alternatively, the dedicated resource for the downlink early data transmission may be a part of the dedicated resources for the early data transmission.

It should be noted that the network device does not know whether the terminal needs to initiate the uplink early data transmission or the downlink early data transmission. In this embodiment, the network device distinguishes between the uplink early data transmission and the downlink early data transmission by using a resource used by the terminal to send the random access request. Specifically, when allocating the dedicated resource for the early data transmission, the network device may allocate a part of the dedicated resources for the early data transmission as the dedicated resource for the uplink early data transmission. When the uplink early data transmission needs to be initiated, the terminal sends the random access request by using the dedicated resource for the uplink early data transmission. In addition, the network device may further indicate a part of the dedicated resources for the early data transmission as the dedicated resource for the downlink early data transmission. When the terminal initiates the downlink early data transmission, the terminal sends the random access request by using the dedicated resource for the downlink early data transmission. In this way, the network device can learn whether the early data transmission initiated by the terminal is the uplink early data transmission or the downlink early data transmission.

Optionally, the dedicated resource for the downlink early data transmission and the dedicated resource for the early data transmission may both be indicated or be jointly indicated by using indication information of the dedicated resource for the early data transmission. The indication information of the dedicated resource for the early data transmission is one of a broadcast message, dedicated signaling, and a paging message. During a specific indicating process, location information of the dedicated resource for the downlink early data transmission and the dedicated resource for the early data transmission may be indicated.

If the network device does not distinguish, during configuration, between the dedicated resource for the uplink early data transmission and the dedicated resource for the downlink early data transmission, the network device may notify, by using the dedicated signaling, the terminal of a random access resource used by the terminal to initiate the downlink early data transmission. In this way, the network device considers that a terminal that performs access by using the random access resource is the terminal that needs to initiate the downlink early data transmission.

In an embodiment, the service attribute includes the service packet attribute.

That if the service attribute meets the preset condition for the early data transmission, the terminal sends the random access request to the network device by using the dedicated resource for the early data transmission may be as follows: If the to-be-transmitted downlink data is a single packet for downlink transmission, the terminal sends the random access request to the network device by using the dedicated resource for the downlink early data transmission.

In still another embodiment, that if the service attribute meets the preset condition for the early data transmission, the terminal sends the random access request to the network device by using the dedicated resource for the early data transmission may be as follows: If the to-be-transmitted downlink data is latency-sensitive service data for downlink transmission, the terminal sends the random access request to the network device by using the dedicated resource for the downlink early data transmission.

That is, in this application, the downlink early data transmission may be initiated for the single packet for the downlink transmission and/or the latency-sensitive service data for the downlink transmission.

A difference between the uplink early data transmission and the downlink early data transmission is that during the downlink early data transmission, after receiving the uplink transmission resource allocated by the network device, the terminal sends a downlink transmission request instead of sending data. Specifically, the downlink transmission request may be carried in a mobile terminated (MT) establishment cause value corresponding to MT access or NAS signaling that is used to send a service request.

It should be noted that resources required for sending the downlink transmission request are much less than those required for transmitting the data, and therefore, to save resources, resources allocated by the network device to the terminal for sending the downlink transmission request are much less than resources allocated to the terminal for sending uplink data.

The dedicated resource for the downlink early data transmission may also be a part of the dedicated resources for the early data transmission, and is indicated to be a dedicated PRACH resource for MT EDT.

Alternatively, the dedicated resource for the early data transmission may be a PRACH resource that is allocated by using an MSG 3 and that carries less than or equal to N bits. To be specific, when the terminal performs access by using the PRACH resource, the network side allocates, to the terminal, a PUSCH resource that is allocated by using the MSG 2 and that carries less than N bits. The PUSCH resource is used to transmit the downlink data transmission request (e.g., MSG 3) that is used to initiate the downlink early data transmission. N is greater than 0, and N is less than or equal to a minimum quantity of bits required for uplink user data transmission. For example, N is 320, 400, or the like. This is not limited in this application.

Figure 3:
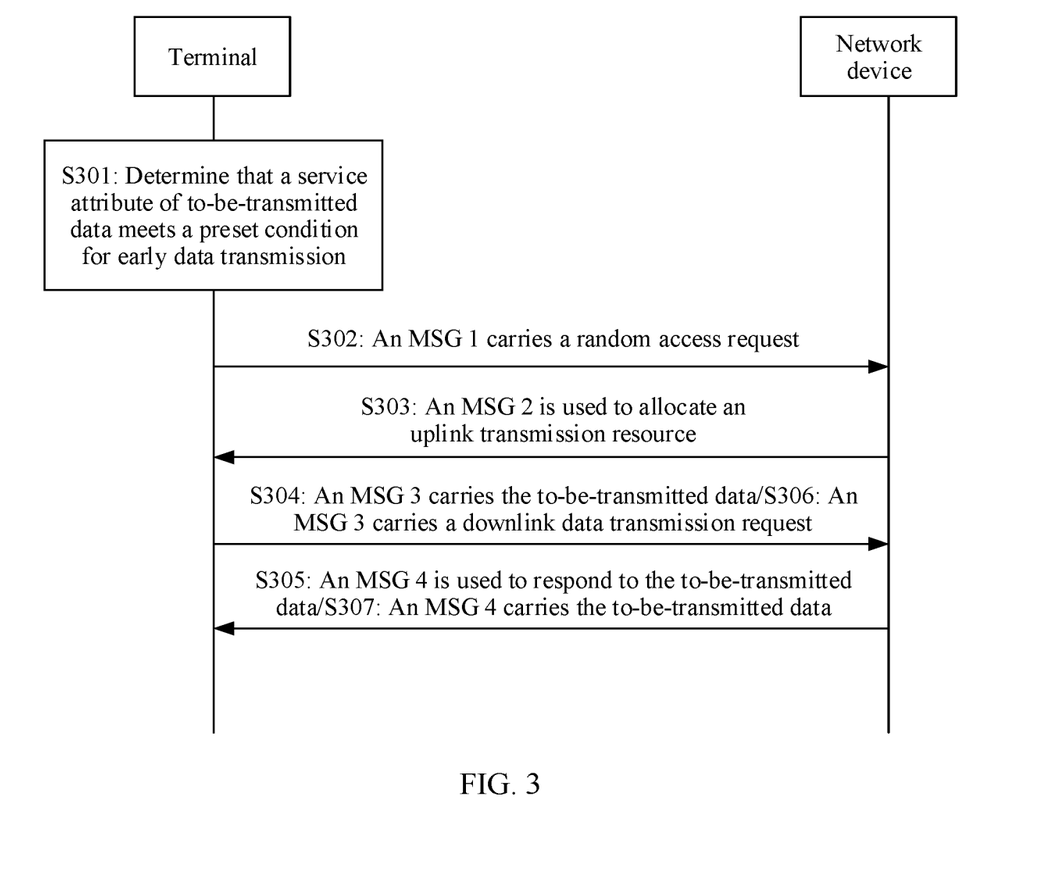
FIG. 3 is a schematic flowchart of a random access method according to another embodiment of this application.

FIG. 3 is a schematic flowchart of a random access method according to another embodiment of this application. As shown in FIG. 3, the method includes the following steps based on a random access process.

S301: A terminal determines that a service attribute of to-be-transmitted data meets a preset condition for early data transmission.

S302: The terminal sends an MSG 1 to a network device by using a dedicated resource for the early data transmission, and the MSG 1 carries a random access request.

To be specific, in a specific implementation process, the terminal may first send the random access request to the network device, and the random access request is used to request initiating downlink early data transmission.

S303: The network device sends an MSG 2 to the terminal. The MSG 2 is used to allocate an uplink transmission resource.

If the to-be-transmitted data is uplink data, S304 and S305 are performed. If the to-be-transmitted data is downlink data, S306 and S307 are performed.

S304: The terminal sends an MSG 3 by using the uplink transmission resource, and the MSG 3 carries the to-be-transmitted data.

S305: The network device sends an MSG 4 to the terminal, and the MSG 4 is used to respond to the to-be-transmitted data.

S306: The terminal sends an MSG 3 by using the uplink transmission resource, and the MSG 3 carries a downlink data transmission request.

S307: The network device sends an MSG 4 to the terminal, and the MSG 4 carries the to-be-transmitted data.

Signaling for transmitting the MSG 3 may be one of the following: an RRC early data request, an RRC connection resume request, a connection less data request, a single data request, and the like. Signaling for transmitting the MSG 4 may be one of the following: an RRC early data response, an RRC connection resume response, a connection less data response, and a single data response.

After receiving the random access request, the network device replies to a random access response if the early data transmission is authorized. For example, the random access response is carried in the MSG 2.

It is assumed that the network device allocates a PUSCH to the terminal, to transmit the uplink data, and the PUSCH can be used to transmit 1000 bits. In this way, during downlink early data transmission, the MSG 3 does not carry service data. Therefore, the random access response may indicate a PUSCH resource that carries a smaller quantity of bits. For example, a PUSCH resource that carries 120 bits serves as the transmission resource used to transmit the downlink data transmission request.

During the downlink early data transmission, in another optional implementation, for that an MME determines the service attribute of the to-be-transmitted data, specifically refer to the foregoing embodiment. To be specific, the MME determines, based on a service latency identifier of the to-be-transmitted data, whether the to-be-transmitted data is latency-sensitive service data. Alternatively, the MME determines, based on a packet attribute of the to-be-transmitted data, whether the to-be-transmitted data is transmitted through single-packet transmission.

If the MME determines that the to-be-transmitted data meets the preset condition for the early data transmission, for example, if the to-be-transmitted data is a single packet for downlink transmission and/or the latency-sensitive service data for the downlink transmission, the MME sends indication information of the service attribute to the network device. The indication information of the service attribute may include the service latency identifier and/or the packet attribute.

Optionally, the MME may send the indication information of the service attribute to the network device by using one of the following information: terminal information transfer signaling, a terminal context resume response, a connection establishment indication, downlink NAS transport signaling, and the like.

After determining, based on the indication information of the service attribute, that the to-be-transmitted data meets the preset condition for the early data transmission, the network device sends the to-be-transmitted data to the terminal. Indication information of a dedicated resource for the downlink early data transmission is used to indicate a part of the allocated dedicated resources for the early data transmission to be the dedicated resource for the downlink early data transmission. Optionally, the indication information of the dedicated resource for the downlink early data transmission includes information about a random access resource for the downlink early data transmission.

Then, the terminal sends the random access request by using the dedicated resource that is used for the downlink early data transmission and that is indicated by the network device, and receives the PUSCH resource allocated by the network device by using the random access response.

In this way, the terminal sends, on the allocated PUSCH resource, the downlink transmission request by using the MSG 3. Optionally, the signaling for transmitting the MSG 3 may be one of the following: the RRC early data request, the RRC connection resume request, the connection less data request, the single data request, and the like. After receiving the downlink transmission request, the network device sends, on the physical downlink shared channel (PDSCH) resource, the to-be-transmitted data. The signaling for transmitting the MSG 4 may be one of the following: the RRC early data response, the RRC connection resume response, the connection less data response, and the single data response.

Figure 4:
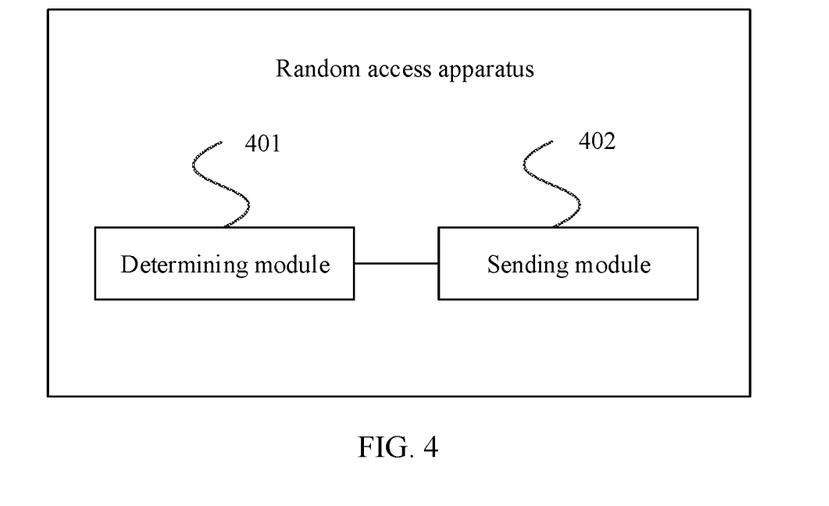
FIG. 4 is a schematic structural diagram of a random access apparatus according to an embodiment of this application.

FIG. 4 is a schematic structural diagram of a random access apparatus according to an embodiment of this application. The apparatus may be integrated into a terminal or a chip of a terminal. As shown in FIG. 4, the apparatus includes a determining module 401 and a sending module 402.

The determining module 401 is configured to determine a service attribute of to-be-transmitted data, where the service attribute includes one or more of the following: a service type attribute, a service packet attribute, and a service latency attribute.

The sending module 402 is configured to send, if the service attribute meets a preset condition for early data transmission, a random access request to a network device by using a dedicated resource for the early data transmission.

Optionally, when the service attribute includes the service type attribute, the determining module 401 is specifically configured to determine the service type attribute of the to-be-transmitted data based on a type identifier of the to-be-transmitted data.

Further, the determining module 401 is specifically configured to determine, based on the type identifier of the to-be-transmitted data, whether the to-be-transmitted data is user data.

Correspondingly, the sending module 402 is specifically configured to send, if the to-be-transmitted data is the user data, the random access request to the network device by using the dedicated resource for the early data transmission.

Optionally, the service attribute includes the service packet attribute, and the determining module 401 is specifically configured to determine the service type attribute of the to-be-transmitted data based on a packet type of the to-be-transmitted data.

Further, the determining module 401 is specifically configured to determine, based on the packet type of the to-be-transmitted data, whether the to-be-transmitted data is transmitted through single-packet transmission or dual-packet transmission.

Correspondingly, the sending module 402 is specifically configured to send, if the to-be-transmitted data is transmitted through the single-packet transmission or the dual-packet transmission, the random access request to the network device by using the dedicated resource for the early data transmission.

Optionally, the service attribute includes the service latency attribute, the determining module 401 is specifically configured to determine the service type attribute of the to-be-transmitted data based on a service latency identifier of the to-be-transmitted data.

Further, the determining module 401 is specifically configured to determine, based on the service latency identifier of the to-be-transmitted data, whether the to-be-transmitted data is latency-sensitive service data.

Correspondingly, the sending module 402 is specifically configured to send, if the to-be-transmitted data is the latency-sensitive service data, the random access request to the network device by using the dedicated resource for the early data transmission.

In another implementation scheme, the service attribute includes the service packet attribute.

The sending module 402 is specifically configured to send, if the to-be-transmitted data is a single packet for downlink transmission, the random access request to the network device by using a dedicated resource for downlink early data transmission.

The service attribute includes the service latency attribute, and the sending module 402 is specifically configured to send, if the to-be-transmitted data is latency-sensitive service data for downlink transmission, the random access request to the network device by using a dedicated resource for downlink early data transmission.

Optionally, the dedicated resource for the downlink early data transmission is a part of the dedicated resources for the early data transmission.

Figure 5:
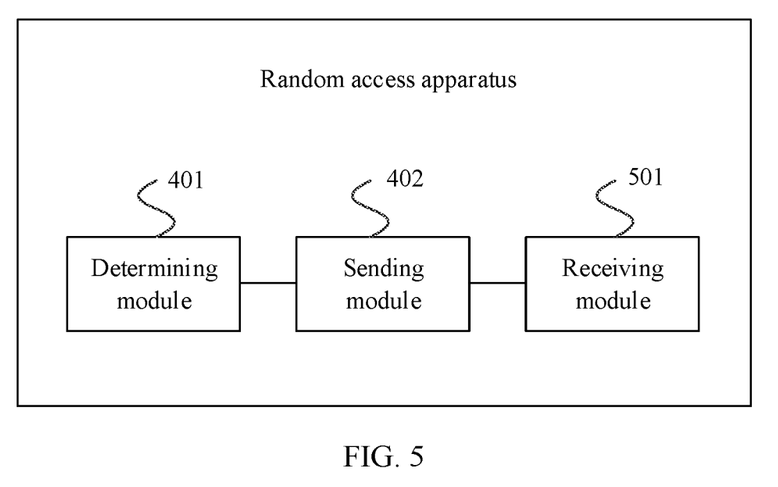
FIG. 5 is a schematic structural diagram of a random access apparatus according to another embodiment of this application.

FIG. 5 is a schematic structural diagram of a random access apparatus according to another embodiment of this application. The apparatus may further include a receiving module 501 based on FIG. 4.

In an embodiment, the receiving module 501 is configured to receive a random access response sent by the network device, where the random access response indicates an uplink transmission resource.

The sending module 402 is further configured to send a downlink data transmission request to the network device by using the uplink transmission resource. The receiving module 501 is further configured to receive the to-be-transmitted data sent by the network device.

In another embodiment, the receiving module 501 is configured to receive indication information that is of the dedicated resource for the early data transmission and that is sent by the network device, where the indication information of the dedicated resource for the early data transmission is one of a broadcast message, dedicated signaling, and a paging message.

The method performed by the terminal in the foregoing embodiment is implemented by the apparatus. Implementation principles and technical effects are similar, and details are not described herein again.

Figure 6:
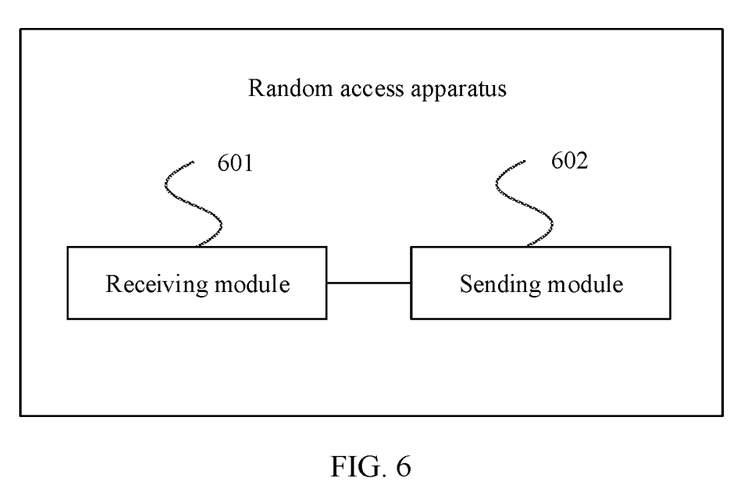
FIG. 6 is a schematic structural diagram of a random access apparatus according to still another embodiment of this application.

FIG. 6 is a schematic structural diagram of a random access apparatus according to still another embodiment of this application. The apparatus may be integrated into a network device or a chip of a network device. As shown in FIG. 6, the apparatus includes a receiving module 601 and a sending module 602.

The receiving module 601 is configured to receive a random access request that is sent, after a terminal determines that a service attribute of to-be-transmitted data meets a preset condition for early data transmission, by the terminal by using a dedicated resource for the early data transmission, where the service attribute includes one or more of the following: a service type attribute, a service packet attribute, and a service latency attribute.

The sending module 602 is configured to send a random access response to the terminal, where the random access response is used to allocate an uplink transmission resource to the terminal.

Further, the receiving module 601 is further configured to obtain the service attribute of the to-be-transmitted service data.

The receiving module 601 is specifically configured to: receive indication information that is of the service attribute and that is sent by an MME; or receive indication information that is of the service attribute and that is sent by the terminal.

The indication information of the service attribute is used to indicate the service attribute of the to-be-transmitted service data.

Optionally, the receiving module 601 is further configured to receive the to-be-transmitted data sent by the terminal by using the uplink resource.

Further, the receiving module 601 is further configured to receive a downlink data transmission request sent by the terminal by using the uplink resource.

The sending module 602 is further configured to send the to-be-transmitted data to the terminal.

Optionally, the receiving module 601 is specifically configured to receive the random access request that is sent, after the terminal determines that the service attribute of the to-be-transmitted data meets the preset condition for the early data transmission, by the terminal by using a dedicated resource for downlink early data transmission, where the dedicated resource for the downlink early data transmission is a part of the dedicated resources for the early data transmission.

The method performed by the network device in the foregoing embodiment is implemented by the apparatus. Implementation principles and technical effects are similar, and details are not described herein again.

It should be noted and understood that division of the modules of the foregoing apparatus is merely logic function division. During actual implementation, some or all modules may be integrated into one physical entity, or the modules may be physically separated. In addition, these modules may be all implemented in a form of software invoked by a processing element, or may be all implemented in a form of hardware. Alternatively, some modules may be implemented in a form of software invoked by a processing element, and some modules are implemented in a form of hardware. For example, the determining module may be a processing element separately disposed, or may be integrated in a chip of the foregoing apparatus for implementation. In addition, the determining module may alternatively be stored in a memory of the foregoing apparatus in a form of program code, and is invoked by a processing element of the foregoing apparatus to perform a function of the determining module. Implementations of other modules are similar to the implementation of the determining module. In addition, these modules may be all or partially integrated, or may be implemented independently. The processing element herein may be an integrated circuit and has a signal processing capability. In an implementation process, steps in the foregoing method or the foregoing modules can be implemented by using a hardware integrated logic circuit in the processing element, or by using instructions in a form of software.

For example, the foregoing modules may be configured as one or more integrated circuits implementing the foregoing method, for example, one or more application-specific integrated circuits (ASIC), one or more microprocessors (DSP), or one or more field programmable gate arrays (FPGA). For another example, when one of the foregoing modules is implemented in a form of program code scheduled by a processing element, the processing element may be a general-purpose processor, for example, a central processing unit (CPU) or another processor that can invoke the program code. For another example, the modules may be integrated together, and implemented in a form of a system-on-a-chip (SOC).

Figure 7:
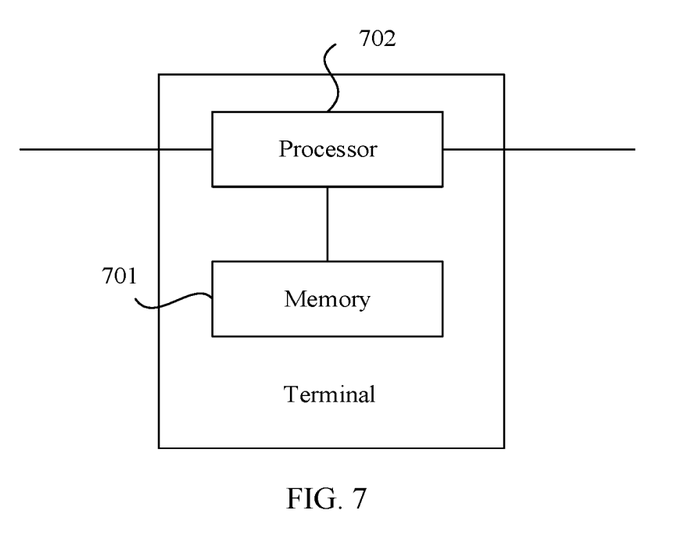
FIG. 7 is a schematic structural diagram of a terminal according to an embodiment of this application.

FIG. 7 is a schematic structural diagram of a terminal according to an embodiment of this application. As shown in FIG. 7, the terminal may include a memory 701 and a processor 702.

The memory 701 may be an independent physical unit, and may be connected to the processor 702 by using a bus. Alternatively, the memory 701 and the processor 702 may be integrated together, and implemented by using hardware, or the like.

The memory 701 is configured to store a program for implementing the foregoing method embodiment. The processor 702 invokes the program to perform operations in the foregoing method embodiment performed by the terminal.

Figure 8:
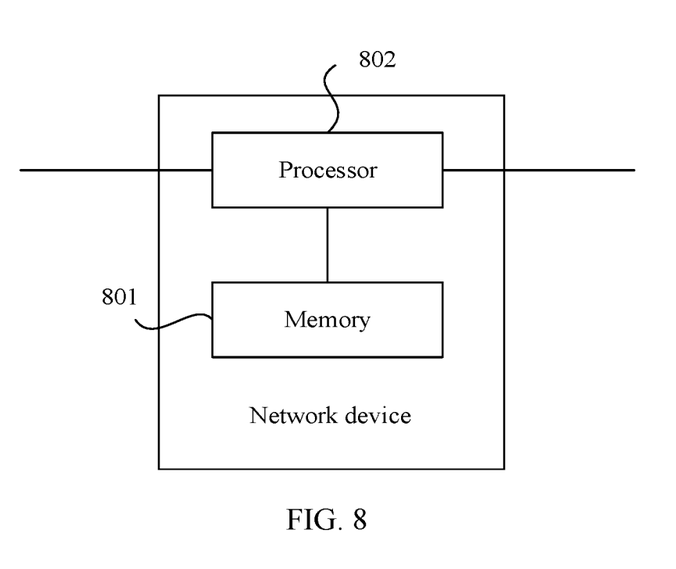
FIG. 8 is a schematic structural diagram of a network device according to an embodiment of this application.

FIG. 8 is a schematic structural diagram of a network device according to an embodiment of this application. As shown in FIG. 8, the network device may include a memory 801 and a processor 802.

The memory 801 may be an independent physical unit, and may be connected to the processor 802 by using a bus. Alternatively, the memory 801 and the processor 802 may be integrated together, and implemented by using hardware, or the like.

The memory 801 is configured to store a program for implementing the foregoing method embodiment. The processor 802 invokes the program to perform operations in the foregoing method embodiment performed by the network device.

Optionally, when a part or all of the random access method in the foregoing embodiment is implemented by using software, the random access apparatus may also include only a processor. The memory configured to store the program is located outside the apparatus. The processor is connected to the memory by using a circuit/wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The memory may include a volatile memory, for example, a random access memory (RAM); the memory may include a non-volatile memory, for example, a flash memory, a hard disk drive (HDD), or a solid-state drive (SSD); or the memory may include a combination of the foregoing types of memories.

What is claimed is:

1. A random access method, comprising:
   determining, by a terminal, a service attribute of to-be-transmitted data, wherein the service attribute comprises one or more of the following: a service type attribute, a service packet attribute, and a service latency attribute, wherein the service type attribute is used to distinguish between different types of services, the service packet attribute is used to distinguish between different types of packet transmission, and the service latency attribute is used to distinguish between different types of data transmission having different latency requirements; and
   sending, by the terminal when the service attribute meets a preset condition for early data transmission, a random access request to a network device using a dedicated resource for the early data transmission, wherein the dedicated resource for the early data transmission is obtained by the terminal from the network device prior to the sending of the random access request to the network device.

2. The method according to claim 1, wherein the service attribute comprises the service type attribute; and
   the determining, by the terminal, the service attribute of to-be-transmitted data comprises:
   determining, by the terminal, the service type attribute of the to-be-transmitted data based on a type identifier of the to-be-transmitted data.

3. The method according to claim 2, wherein the determining, by the terminal, the service type attribute of the to-be-transmitted data based on the type identifier of the to-be-transmitted data comprises:
  determining, by the terminal based on the type identifier of the to-be-transmitted data, whether the to-be-transmitted data is user data; and
  correspondingly, the sending, by the terminal when the service attribute meets the preset condition for early data transmission, the random access request to the network device using the dedicated resource for the early data transmission comprises:
  sending, by the terminal when the to-be-transmitted data is the user data, the random access request to the network device using the dedicated resource for the early data transmission.

4. The method according to claim 1, wherein the service attribute comprises the service packet attribute; and
  the determining, by the terminal, the service attribute of to-be-transmitted data comprises:
  determining, by the terminal, the service type attribute of the to-be-transmitted data based on a packet type of the to-be-transmitted data.

5. The method according to claim 4, wherein the determining, by the terminal, the service type attribute of the to-be-transmitted data based on the packet type of the to-be-transmitted data comprises:
  determining, by the terminal based on the packet type of the to-be-transmitted data, whether the to-be-transmitted data is transmitted through single-packet transmission or dual-packet transmission; and
  correspondingly, the sending, by the terminal when the service attribute meets the preset condition for early data transmission, the random access request to the network device using the dedicated resource for the early data transmission comprises:
  sending, by the terminal when the to-be-transmitted data is transmitted through the single-packet transmission or the dual-packet transmission, the random access request to the network device using the dedicated resource for the early data transmission.

6. The method according to claim 1, wherein the service attribute comprises the service latency attribute; and
  the determining, by the terminal, the service attribute of to-be-transmitted data comprises:
  determining, by the terminal, the service type attribute of the to-be-transmitted data based on a service latency identifier of the to-be-transmitted data.

7. The method according to claim 6, wherein the determining, by the terminal, the service type attribute of the to-be-transmitted data based on the service latency identifier of the to-be-transmitted data comprises:
  determining, by the terminal based on the service latency identifier of the to-be-transmitted data, whether the to-be-transmitted data is latency-sensitive service data; and
  correspondingly, the sending, by the terminal when the service attribute meets the preset condition for early data transmission, the random access request to the network device using the dedicated resource for the early data transmission comprises:
  sending, by the terminal when the to-be-transmitted data is the latency-sensitive service data, the random access request to the network device using the dedicated resource for the early data transmission.

8. The method according to claim 1, wherein the service attribute comprises the service packet attribute; and the sending, by the terminal when the service attribute meets the preset condition for early data transmission, the random access request to the network device using the dedicated resource for the early data transmission comprises:
  sending, by the terminal when the to-be-transmitted downlink data is a single packet for downlink transmission, the random access request to the network device using the dedicated resource for downlink early data transmission.

9. The method according to claim 1, wherein when the service attribute comprises the service latency attribute, the sending, by the terminal when the service attribute meets the preset condition for early data transmission, the random access request to the network device using the dedicated resource for the early data transmission comprises:
  sending, by the terminal when the to-be-transmitted downlink data is latency-sensitive service data for downlink transmission, the random access request to the network device using the dedicated resource for downlink early data transmission.

10. The method according to claim 9, wherein the dedicated resource for the downlink early data transmission is a part of the dedicated resources for the early data transmission.

11. The method according to claim 10, after the sending, by the terminal, the random access request to the network device using the dedicated resource for the early data transmission, further comprising:
  receiving, by the terminal, a random access response sent by the network device, wherein the random access response indicates an uplink transmission resource;
  sending, by the terminal, a downlink data transmission request to the network device using the uplink transmission resource; and
  receiving, by the terminal, the to-be-transmitted data sent by the network device.

12. The method according to claim 1, wherein the method further comprises:
  receiving, by the terminal, indication information that is of the dedicated resource for the early data transmission and that is sent by the network device, wherein the indication information of the dedicated resource for the early data transmission is one of a broadcast message, dedicated signaling, and a paging message, and wherein the indication information indicates a part of the dedicated resource that is allocated for early data transmission.

13. A random access apparatus, comprising:
  a memory storing a one or more instructions; and
  a processor coupled with the memory and configured to execute the one or more instructions, which when executed by the processor configure the processor to:
  determine a service attribute of to-be-transmitted data, wherein the service attribute comprises one or more of the following: a service type attribute, a service packet attribute, and a service latency attribute, wherein the service type attribute is used to distinguish between different types of services, the service packet attribute is used to distinguish between different types of packet transmission, and the service latency attribute is used to distinguish between different types of data transmission having different latency requirements; and
  send, when the service attribute meets a preset condition for early data transmission, a random access request to a network device using a dedicated resource for the early data transmission, wherein the dedicated resource for the early data transmission is obtained by the random access apparatus from the network device prior to the sending of the random access request to the network device.

14. The apparatus according to claim 13, wherein the service attribute comprises the service type attribute; and
the processor further configured to determine the service type attribute of the to-be-transmitted data based on a type identifier of the to-be-transmitted data.

15. The apparatus according to claim 14, wherein the processor is configured to determine, based on the type identifier of the to-be-transmitted data, whether the to-be-transmitted data is user data; and
correspondingly, send, when the to-be-transmitted data is the user data, the random access request to the network device using the dedicated resource for the early data transmission.

16. The apparatus according to claim 13, wherein the service attribute comprises the service packet attribute; and
the processor is further configured to determine the service type attribute of the to-be-transmitted data based on a packet type of the to-be-transmitted data.

17. The apparatus according to claim 16, wherein the processor configured to determine, based on the packet type of the to-be-transmitted data, whether the to-be-transmitted data is transmitted through single-packet transmission or dual-packet transmission; and
correspondingly, send, when the to-be-transmitted data is transmitted through the single-packet transmission or the dual-packet transmission, the random access request to the network device using the dedicated resource for the early data transmission.

18. The apparatus according to claim 13, wherein the service attribute comprises the service latency attribute; and
the processor is further configured to determine the service type attribute of the to-be-transmitted data based on a service latency identifier of the to-be-transmitted data.

19. The apparatus according to claim 18, wherein the processor configured to determine, based on the service latency identifier of the to-be-transmitted data, whether the to-be-transmitted data is latency-sensitive service data; and
correspondingly, send, when the to-be-transmitted data is the latency-sensitive service data, the random access request to the network device using the dedicated resource for the early data transmission.

20. The apparatus according to claim 13, wherein the service attribute comprises the service packet attribute; and the processor is configured to send, when the to-be-transmitted data is a single packet for downlink transmission, the random access request to the network device using a dedicated resource for downlink early data transmission.

* * * * *